(12) United States Patent
Fioravanti

(10) Patent No.: US 8,256,826 B2
(45) Date of Patent: Sep. 4, 2012

(54) MOTOR CAR, IN PARTICULAR, A RACING CAR

(76) Inventor: Leonardo Fioravanti, Moncalieri (IT)

( * ) Notice: Subject to any disclaimer, the term of this patent is extended or adjusted under 35 U.S.C. 154(b) by 0 days.

(21) Appl. No.: 13/202,737

(22) PCT Filed: Feb. 22, 2010

(86) PCT No.: PCT/IB2010/050760
§ 371 (c)(1),
(2), (4) Date: Aug. 22, 2011

(87) PCT Pub. No.: WO2010/113049
PCT Pub. Date: Oct. 7, 2010

(65) Prior Publication Data
US 2012/0038185 A1    Feb. 16, 2012

(30) Foreign Application Priority Data
Feb. 23, 2009 (IT) ............... TO2009A0129

(51) Int. Cl.
*B62D 35/00* (2006.01)
(52) U.S. Cl. .................. 296/181.5; 296/180.1
(58) Field of Classification Search .......... 296/1.01, 296/180.1, 181.1, 181.5, 198; 280/159, 160, 280/847, 849, 851, 854; 180/903; D12/82, D12/86, 88
See application file for complete search history.

(56) References Cited

U.S. PATENT DOCUMENTS
D227,358 S  *  6/1973  Kachler .................. D12/88
(Continued)

FOREIGN PATENT DOCUMENTS
DE    10 2004 035496 A1    2/2006
(Continued)

OTHER PUBLICATIONS

Luini, Mario, "La Williams-BMW FW26 sort les crocs!" Revue Automobile, Buechler Grafino AG, Berne, CH, No. 1/02, Jan. 8, 2004, pp. 16-17.
(Continued)

*Primary Examiner* — Glenn Dayoan
*Assistant Examiner* — Gregory Blankenship
(74) *Attorney, Agent, or Firm* — Sughrue Mion, PLLC

(57) ABSTRACT

A motor car including a central body with a nose having a tapered shape, an intermediate portion in which a driver's compartment is formed, and a tail portion having a tapered shape. The body is shaped such that, during movement, it generates a substantially zero overall lift. A pair of steering front wheels is connected externally to the front portion of the central body and each of them has, associated therewith, a front fairing which leaves a top portion of the wheel uncovered. These fairings are connected to the ends of a front transverse wing which extends from both sides of the nose of the central body and which is profiled so as to generate a negative lift during movement. A pair of rear wheels are connected to the tail portion of the central body and each of them has, associated therewith, a front fairing and rear fairing which leave a top portion of the wheel uncovered. The fairings associated with the rear wheels are joined to corresponding intermediate wings which extend laterally, towards the outside and the rear, from the intermediate portion of the central body. The rear fairings are connected to the ends of an essentially delta-shaped, rear, transverse wing which is connected to the bottom part of the central body and which is profiled such as to generate a negative lift during movement.

15 Claims, 6 Drawing Sheets

U.S. PATENT DOCUMENTS

| | | | |
|---|---|---|---|
| D247,192 S * | 2/1978 | Gardner | D21/550 |
| D261,672 S * | 11/1981 | Phillippe | D21/550 |
| D268,940 S * | 5/1983 | Head | D21/550 |
| 4,455,045 A * | 6/1984 | Wheeler | 296/181.5 |
| D275,940 S * | 10/1984 | Ogilvie | D12/88 |
| 4,946,218 A * | 8/1990 | Jurik | 296/180.1 |
| 5,056,860 A * | 10/1991 | Cornacchia et al. | 296/180.5 |
| D506,415 S * | 6/2005 | Byrne | D12/88 |
| D510,055 S * | 9/2005 | Yi | D12/88 |
| D528,041 S * | 9/2006 | Costa | D12/88 |
| D552,510 S * | 10/2007 | Costa | D12/88 |
| D575,195 S * | 8/2008 | Steinhauser | D12/88 |
| D587,629 S * | 3/2009 | Crijns | D12/88 |
| D589,399 S * | 3/2009 | Tombazis | D12/88 |
| D630,552 S * | 1/2011 | Tombazis | D12/88 |
| D631,396 S * | 1/2011 | Ganassi et al. | D12/88 |
| D644,146 S * | 8/2011 | Ganassi et al. | D12/88 |

FOREIGN PATENT DOCUMENTS

| | | | |
|---|---|---|---|
| FR | 2 657 060 A1 | | 7/1991 |
| GB | 2268451 | * | 1/1994 |
| WO | 98/18668 A1 | | 5/1998 |
| WO | 99/61300 A1 | | 12/1999 |

OTHER PUBLICATIONS

International Search Report of PCT/IB2010/050760, dated Oct. 18, 2010.

* cited by examiner

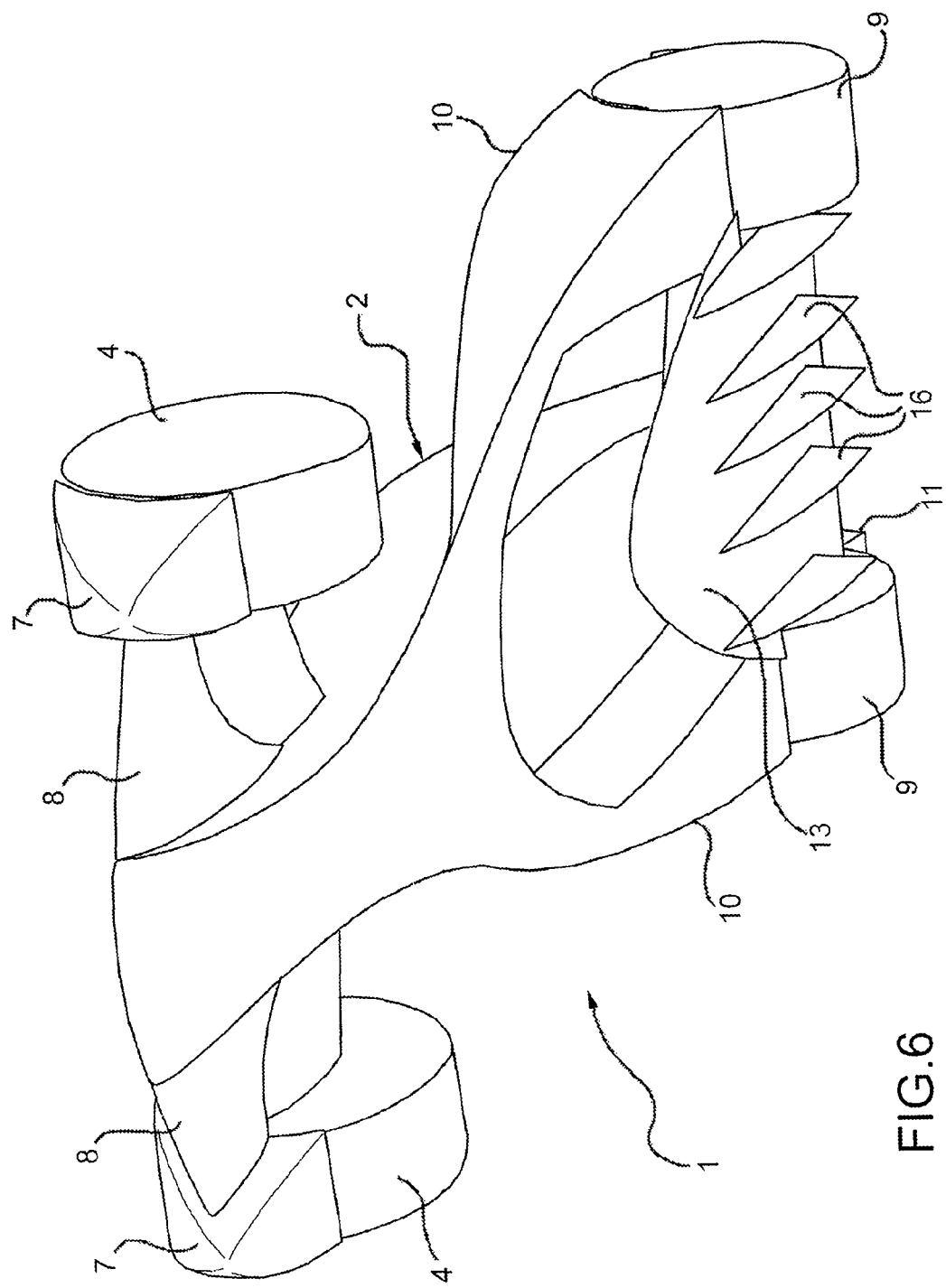

MOTOR CAR, IN PARTICULAR, A RACING CAR

CROSS REFERENCE TO RELATED APPLICATIONS

This application is a National Stage of International Application No. PCT/IB2010/050760 filed Feb. 22, 2010, claiming priority based on Italian Patent Application No. TO2009A000129 filed Feb. 23, 2009 the contents of all of which are incorporated herein by reference in their entirety.

BACKGROUND OF THE INVENTION

The present invention relates to a motor-car, in particular a racing car, for use in races on tracks and road circuits, such as the present-day Formula 1 racing competitions.

One object of the present invention is to provide an innovative racing car which, among other things, is able to achieve a major reduction in the turbulent aerodynamic slipstream generated at the rear.

SUMMARY OF THE INVENTION

This object, together with other objects, is achieved according to the invention by a motor-car comprising:
  a central longitudinal body, with a front portion or nose having a tapered shape, an intermediate portion in which a driver's compartment is formed, and a rear or tail portion having a tapered shape; said body having a longitudinal profile which at the bottom is convex in the front portion and rear portion and concave in the intermediate portion, this body being shaped such that, during movement, it generates a substantially zero lift;
  a pair of steering front wheels which are connected externally to the front portion of the central body and each have, associated therewith, a respective, forwardly tapered, front fairing which leaves a top portion of the wheel uncovered; said front fairings being connected to the ends of a front transverse wing which extends from both sides of the nose of the central body and which is profiled in such a way as to generate a negative lift during movement; and
  a pair of rear wheels which are connected externally to the tail portion of the central body, substantially aligned with the front wheels, and each have, associated therewith, a respective, forwardly tapered, front fairing and rearwardly tapered rear fairing which leave a top portion of the wheel uncovered;
  the front fairings which are associated with the rear wheels being joining at the front to corresponding intermediate wings which extend laterally, towards the outside and the rear, from the bottom part of an intermediate portion of the central body;
  the rear fairings being connected to the end of an essentially delta-shaped, rear, transverse wing which is connected to the bottom part of the central body and which is profiled such as to generate a negative lift during movement.

According to a further characteristic feature, the front fairings which are associated with the rear wheels house respective forced-air cooling radiators, said fairings having at the front respective openings for the intake of air directed towards said radiators, said openings being arranged and oriented such as to be acted on by a substantial portion of the slipstream generated during movement by the front wheels.

BRIEF DESCRIPTION OF THE DRAWINGS

Further characteristic features and advantages of the invention will become clear from the detailed description below, provided purely by way of a non-limiting example, with reference to the accompanying drawings in which:
FIG. 6 is a perspective view, from below, of the motor-car according to the preceding figures.

DETAILED DESCRIPTION OF THE INVENTION

Figure 1:
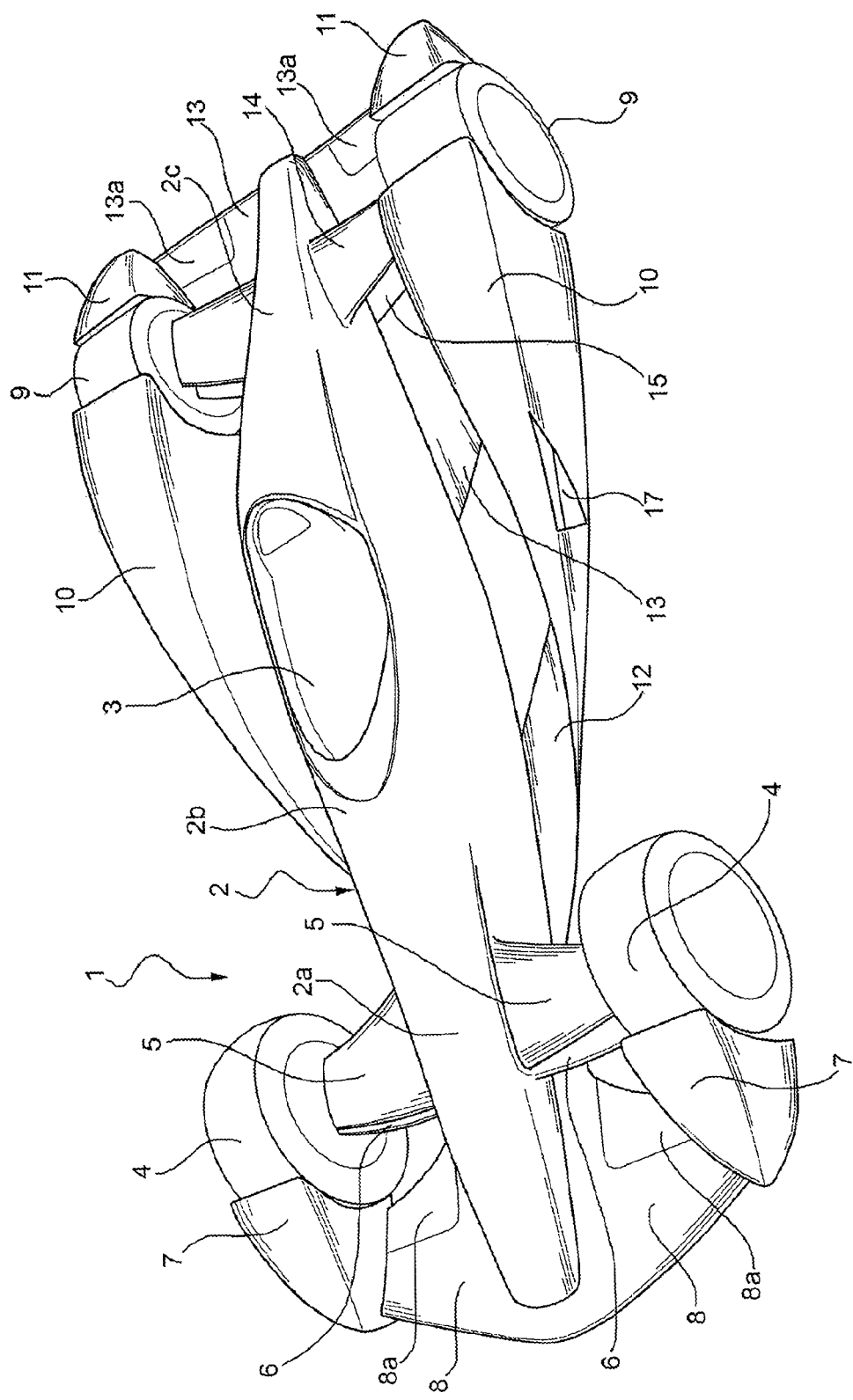
FIG. 1 is a perspective view of a racing car according to the present invention.
Figure 2:
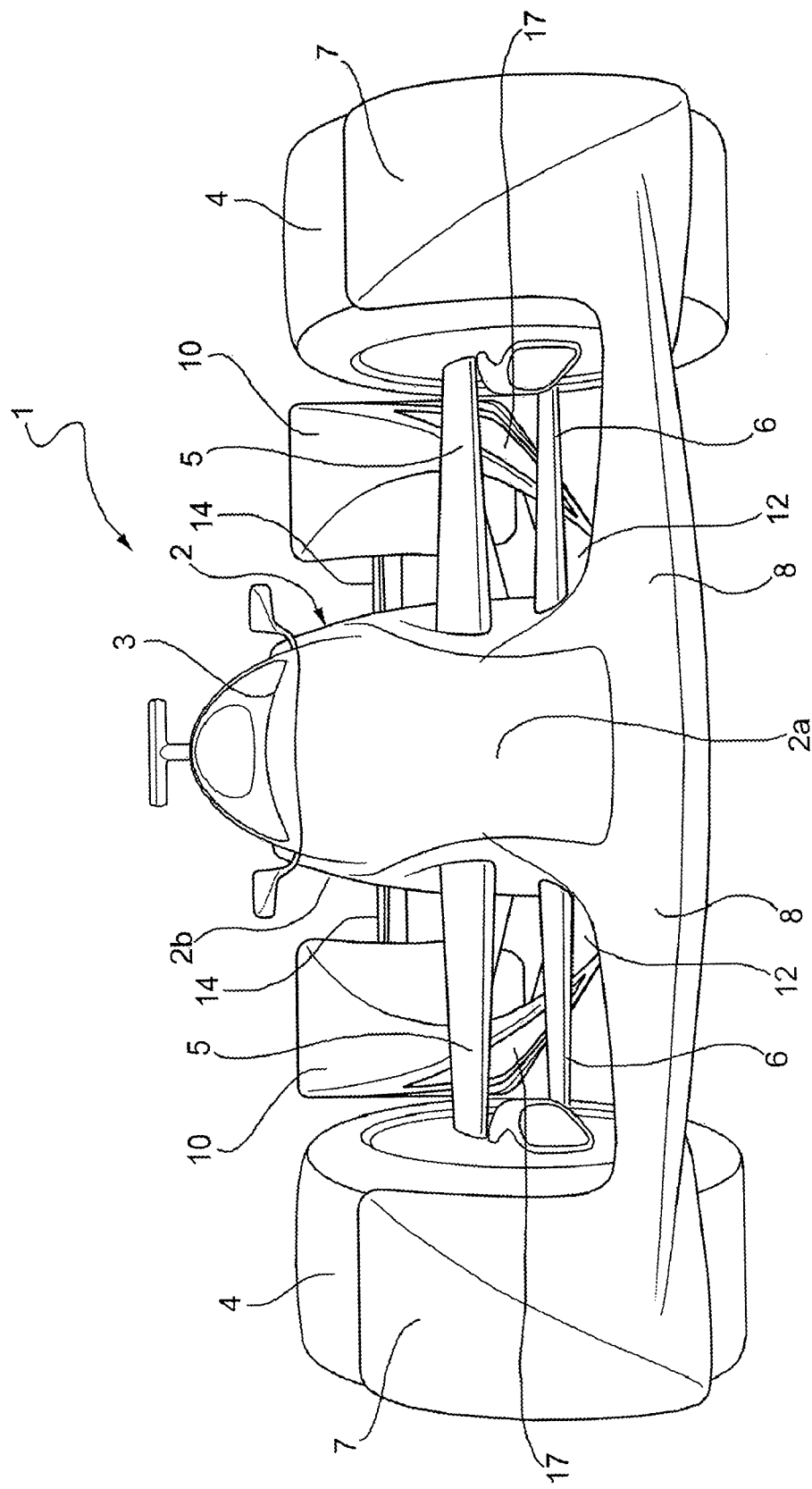
FIG. 2 is a front perspective view of the motor-car according to FIG. 1.

In the drawings 1 denotes overall a motor-car, and in particular a racing car, according to the present invention.

The motor-car 1 comprises a central longitudinal body 2 which has a front portion or nose 2a with a tapered shape, an intermediate portion 2b in which a driver's compartment 3 is formed, and a rear or tail portion 2c, which also has a tapered shape.

Figure 4:
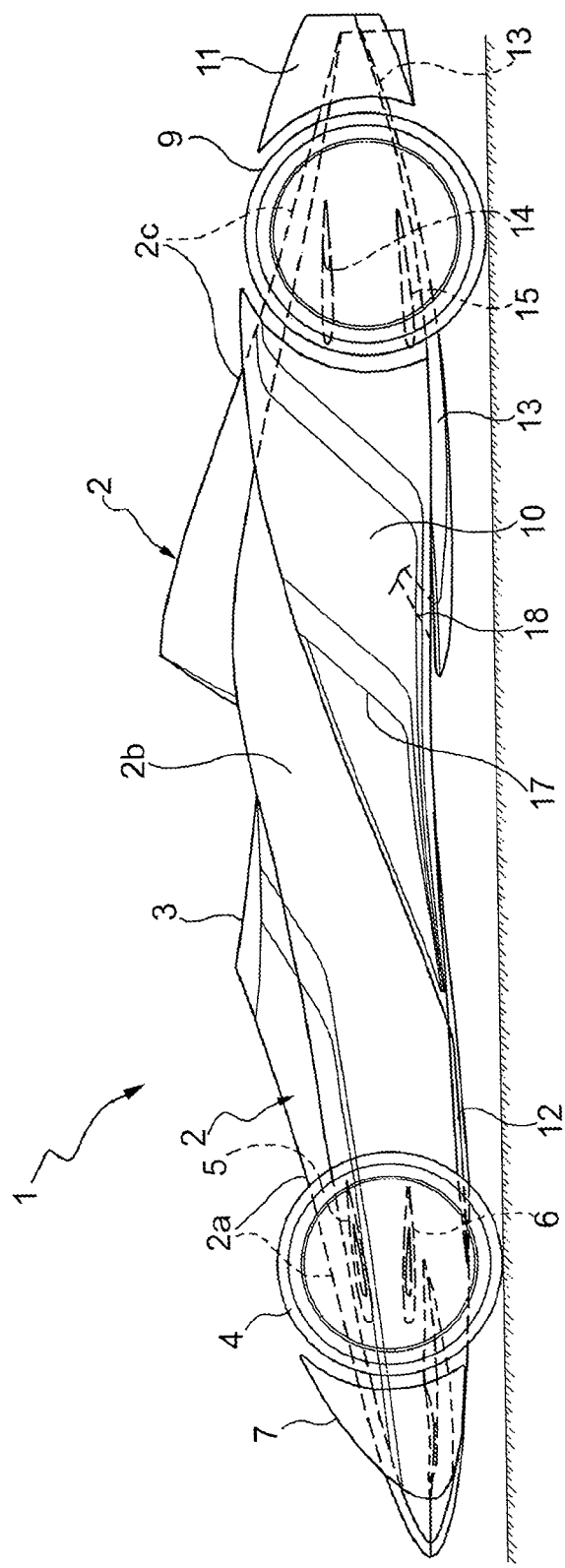
FIG. 4 is a side view of the motor-car according to the preceding figures.

As can be understood better viewing FIG. 4, the central longitudinal body 2 of the motor-car has a profile which at the bottom is convex in the front portion and rear portion and concave in the intermediate portion. This central body 2 is shaped such that during movement it generates a substantially zero overall lift, i.e. a positive lift and negative lift which essentially cancel out each other.

The cross-sections of the central longitudinal body 3 are at least approximately oval-shaped. This body is profiled so as to have a minimum aerodynamic resistance and generate at the rear a minimum aerodynamic slipstream.

The motor-car 1 has a pair of steering front wheels 4 which are connected externally to the front portion 2a of the central body 2 by means of tie-rods and suspensions of the type known per se which are advantageously covered by pairs of wings 5 and 6.

Each of the front wheels 4 has, associated therewith, a respective, forwardly tapered, front fairing 7. In the example of embodiment shown these fairings have an essentially frusto-pyramidal form.

The front fairings 7 leave the top portions of the associated wheels 4 uncovered. As a result, it is possible to achieve advantageously, during movement, an improved adherence to the ground owing to the so-called Magnus effect.

The front fairings 7 are conveniently connected to and preferably incorporated in the ends of a front transverse wing which is denoted overall by 8 in the drawings and which extends from both sides of the nose 2a of the central body 2.

The front wing 8 is profiled in a known manner so as to generate, during movement, a substantial negative lift.

The motor-car 1 also has a pair of rear wheels 9 which are connected externally to the tail portion 2c of the central body 2, substantially aligned with the front wheels 4.

A respective front fairing 10, which is forwardly tapered, and rear fairing 11, which is rearwardly tapered, are associated with each rear wheel 9.

Figure 3:
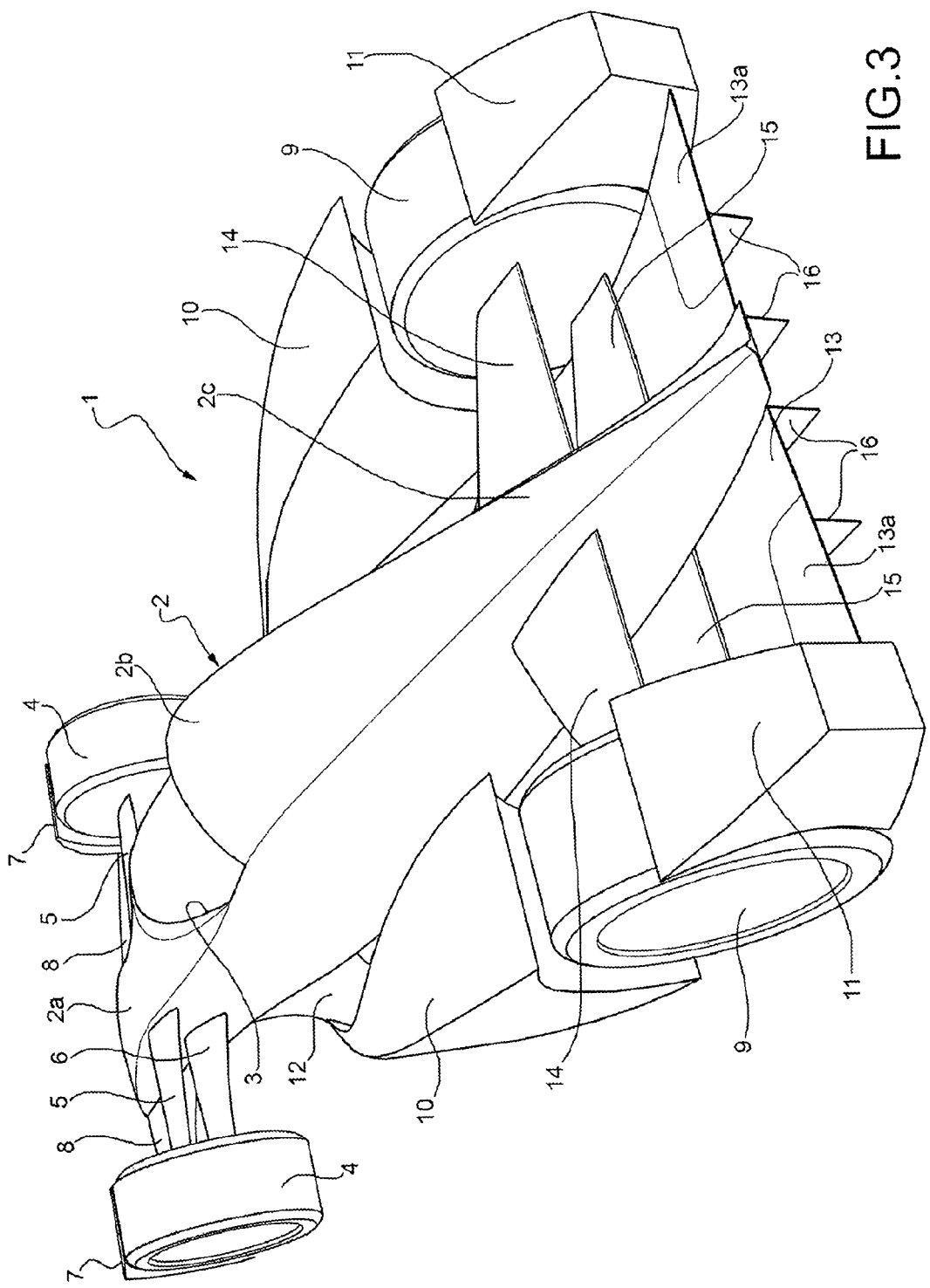
FIG. 3 is a rear perspective view of the motor-car according to the preceding figures.

As can be seen more clearly in FIGS. 1, 3 and 4, the fairings 10 and 11 associated with the rear wheels 9 leave the top portions of the latter uncovered, so as to exploit in this case also the so-called Magnus effect.

The front fairings 10 associated with the wheels 9 are joined at the front to corresponding intermediate wings 12 (FIGS. 1 to 5) which extend laterally, towards the outside and rear, from the bottom rear part of the nose 2a of the central body 2.

With reference in particular to FIGS. 1 to 4, it can be seen that the wings 12 extend from the central body 2, having an orientation which is slightly inclined downwards and forwards (FIG. 4), and then twist gradually so as to be joined to the fairings 10 associated with the rear wheels 9.

The rear fairings 11 have an essentially frusto-pyramidal form, with corners which are curved and rounded, as is the case with the corners of the front fairings 7.

With reference in particular to FIG. 4, preferably the rear wheels 9 have a diameter which is greater than that of the front wheels 4.

Figure 5:
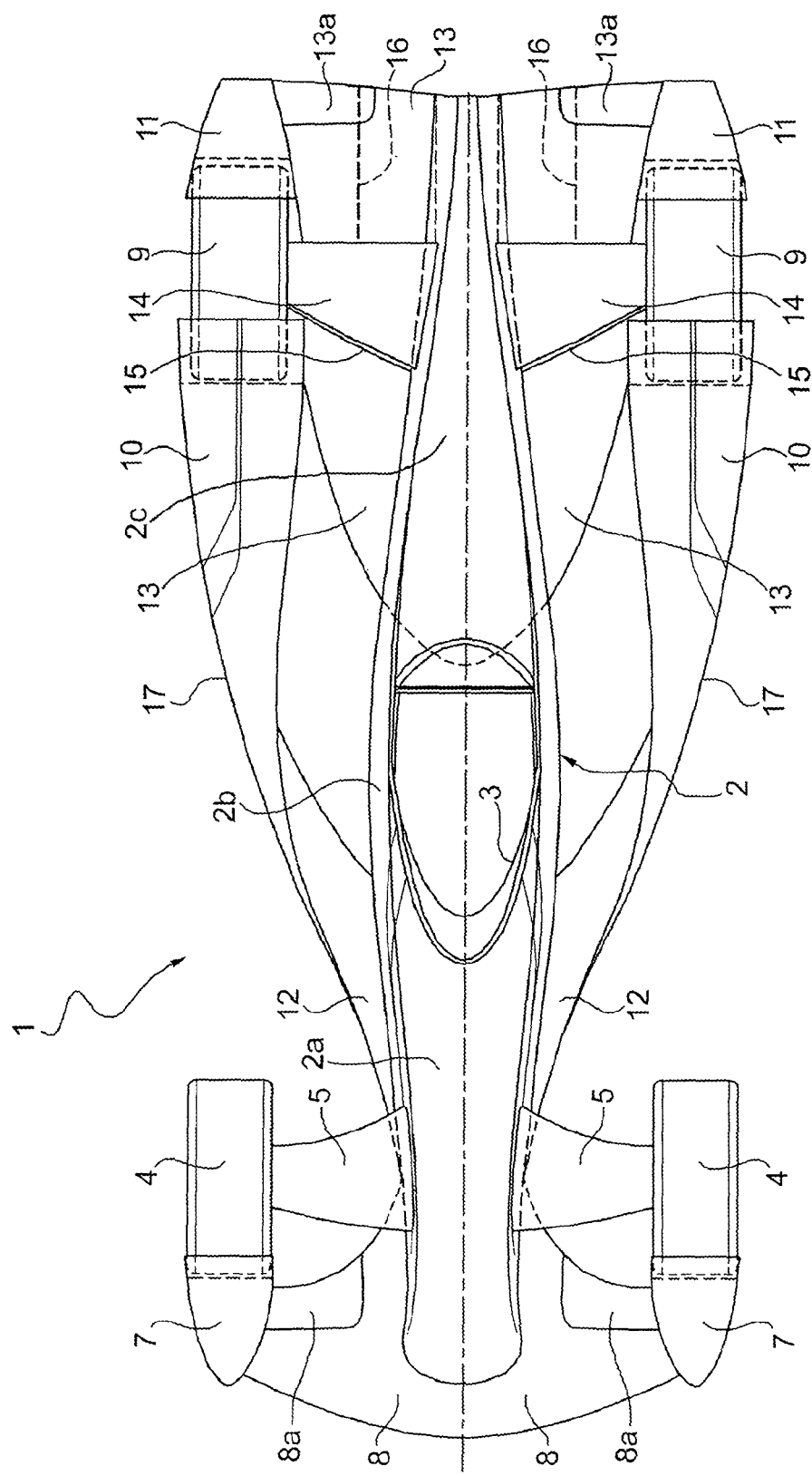
FIG. 5 is a top plan view of the motor-car according to the preceding figures.

With reference in particular to FIGS. 1 to 5, a rear transverse wing 13, which is essentially delta-shaped, is connected to the central body 2 at the bottom (see in particular FIG. 5).

The rear wing 13 is profiled so as to generate a substantial negative lift during movement.

As can be seen in FIG. 4, the front part of the wing 13 may be slightly separated, vertically, from the bottom surface of the central portion 2b of the body 2; this surface of the body 2 may thus be provided with an air intake 18 for the KERS (Kinetic Energy Recovery System) with which the car may be conveniently equipped.

With reference to FIG. 3, the rear delta-shaped wing 13 extends underneath pairs of wings 14 and 15 which extend from the tail portion 2c of the central body 2 and cover the arms of the suspensions of the rear wheels 9.

The rear ends of the fairings 10 are connected to the intermediate part of the delta-shaped rear wing 13. The rear fairings 11 are connected to the rear part of said wing 13. The transverse wing 13 has conveniently the rear part profiled such as to perform an aerodynamic diffuser function for increasing the ground effect (FIGS. 3 and 4).

In the rear part of the wing 13 a plurality of flow distribution partitions 16, which are substantially vertical and extend essentially in the longitudinal direction, extend from the bottom side of said wing (FIGS. 3 and 6).

The motor-car 1 is conveniently provided with an engine, for example an internal-combustion engine, which is housed, together with the fuel tank and the gearbox, in the portion of the central longitudinal body 2 situated behind the driver's compartment 3. The motor-car may also be provided with an electric or hybrid propulsion system.

Conveniently, respective air cooling radiators are housed inside the fairings 10 associated with the rear wheels 9. The fairings 10 are provided, for this purpose, at the front with respective openings 17 for entry of the air directed towards the radiators contained therein. These openings 17 are arranged and oriented so that, during movement, they are acted on by a substantial portion of the slipstream generated by the front wheels 4 (see in particular FIGS. 1 and 2).

Conveniently, the wheels 4 and 9 may be provided with tyres, rims and brakes essentially of the type for road use.

The associated suspensions are preferably of the active type.

The front wing 8 and the rear wing 13 may conveniently comprise respective pivotably controlled rear flaps 8a, 13a (FIGS. 1, 3 and 5).

Overall, the racing car described above has excellent aerodynamic characteristics, in particular a low resistance and an optimum overall negative lift, and during movement generates an extremely limited slipstream. This characteristic is particularly advantageous since it does not hinder the overtaking maneuvers performed by similar racing cars, therefore making the races more exciting and attractive for the public. Obviously, without affecting the principle of the invention, the embodiments and the constructional details may be significantly modified with respect to that described and illustrated purely by way of a non-limiting example, without thereby departing from the scope of the invention as defined in the accompanying claims.

The invention claimed is:

1. Motor-car, comprising
a central longitudinal body, with a front portion or nose having a tapered shape, an intermediate portion in which a driver's compartment is formed, and a rear or tail portion having a tapered shape; said body having a longitudinal profile which at the bottom is convex in the front portion and the rear portion and concave in the intermediate portion, and being shaped such that, during movement, it generates a substantially zero overall lift;
a pair of steering front wheels which are connected externally to the front portion of the central body and each have, associated therewith, a respective, forwardly tapered, front fairing which leaves a top portion of the wheel uncovered; said front fairings being connected to the ends of a front transverse wing which extends from both sides of the nose of the central body and which is profiled in such a way as to generate a negative lift during movement;
a pair of rear wheels which are connected externally to the tail portion of the central body, substantially aligned with the front wheels, and each have, associated therewith, a respective, forwardly tapered, front fairing and rearwardly tapered rear fairing which leave a top portion of the wheel uncovered;
the front fairings which are associated with the rear wheels being joined at the front to corresponding intermediate wings which extend laterally, towards the outside and the rear, from the bottom part of an intermediate portion of the central body;
the rear fairings being connected to the ends of an essentially delta-shaped, rear, transverse wing which is connected to the bottom part of the central body and which is profiled such as to generate a negative lift during movement.

2. Motor-car according to claim 1, wherein the front fairings which are associated with the rear wheels house respective air cooling radiators, said fairings having at the front respective openings for the intake of air directed towards said radiators; said openings being arranged and oriented such as to be acted on by a substantial portion of the slipstream generated during movement by the front wheels.

3. Motor-car according to claim 1, wherein the front fairings associated with the rear wheels are also interconnected with the rear transverse wing.

4. Motor-car according to claim 1, wherein said intermediate wings extend from the bottom rear part of the nose of the central body.

5. Motor-car according to claim 1, wherein the rear transverse wing extends from the intermediate portion of the central body having a concave bottom profile, beyond the rear wheels.

6. Motor-car according to claim 1, wherein the rear transverse wing has the rear part profiled such as to perform an aerodynamic diffuser function for increasing the ground effect.

7. Motor-car according to claim 1, wherein the rear wheels have a diameter which is greater than that of the front wheels.

8. Motor-car according to claim 1, wherein the wheels are provided with active-type suspensions.

9. Motor-car according to claim 1, wherein the fairings associated with the front wheels have an essentially pyramidal shape, with curved and rounded corners.

10. Motor-car according to claim 1, wherein said rear fairings have an essentially frusto-pyramidal shape.

11. Motor-car according to claim 1, wherein the front transverse wing comprises pivotably controlled rear flaps.

12. Motor-car according to claim 1, wherein the rear transverse wing comprises pivotably controlled rear flaps.

13. Motor-car according to claim 1, wherein the front part of the rear transverse wing is vertically separated from the above-lying bottom surface of the central body.

14. Motor-car according to claim 13, wherein the bottom surface of the central body is provided with at least one air intake for a kinetic energy recovery system.

15. Motor-car according to claim 14, wherein said air intake faces said front portion of the rear transverse wing.

* * * * *